Dec. 27, 1960

M. P. SCHOLZ 2,966,351

DASH-POT DEVICE

Filed June 12, 1959

INVENTOR
MICHAEL PETER SCHOLZ
BY Blum, Moscovitz,
Friedman & Blum

ATTORNEYS.

United States Patent Office 2,966,351
Patented Dec. 27, 1960

2,966,351

DASH-POT DEVICE

Michael Peter Scholz, Cranford, N.J., assignor to Paragon Products Corporation, Newark, N.J., a corporation of New Jersey Filed June 12, 1959, Ser. No. 819,966

3 Claims. (Cl. 267—1)

My invention relates to a new and improved dash-pot device.

The invention can be used as an anti-stall device for delaying the final closing movement of the valve of a carburetor or the throttle valve of an engine, in order to prevent stalling.

It is well known to provide dash-pot devices for such purpose and for other purposes as exemplified by Brewer U.S. Pat. No. 2,346,353, dated April 11, 1944; Harding U.S. Patent No. 2,387,066, dated October 16, 1945; and others. The Braun U.S. Patent No. 2,657,037, dated October 27, 1953, illustrates the use of a dash-pot device for controlling the throttle valve of a carburetor.

According to my invention, I provide a simple device which can be easily manufactured and assembled at low cost and which has an excellent positive action for delaying the final closing movement of an engine throttle valve, in order to prevent stalling.

The device comprises a spindle or bumper stud which is longitudinally movable to and fro. This spindle has a fitting which may be made of brass or plastic or other non-magnetic material. This fitting is rigidly fixed to the spindle so that the fitting and the spindle reciprocate longitudinally in unison.

This fitting has a small ball valve which is made of steel or other ferro-magnetic material. The fitting also has a small permanent bar magnet. This permanent bar magnet normally keeps the ball valve on its valve seat, which is provided in the fitting, in a closure position of said ball valve. The seat of the ball valve is set or shaped, in order to provide a channel or channels which permit a limited passage of air through said channel or channels when the ball valve is in closure position.

When the spindle is pushed inwardly relative to a casing in the dash-pot action of such spindle, the air which is compressed by such dash-pot action can escape slowly through the set passage in the seat of the closed ball valve, to the outer atmosphere. The spindle is biased outwardly in the return movement by means of a spring device. When the spindle is thus biased outwardly or returned to its normal position by said spring device, the air pressure which results from this return movement of the spindle temporarily displaces the ball valve from its seat against the force of the permanent magnet, thus permitting the air freely to escape to the outer atmosphere without retarding the return movement of the spindle.

The fitting is provided with a stop, in order to limit the movement of the ball valve away from its seat.

The invention is further disclosed in the following description and in the annexed drawings which illustrate a preferred embodiment of the device, without limitation thereto.

Figure 1:
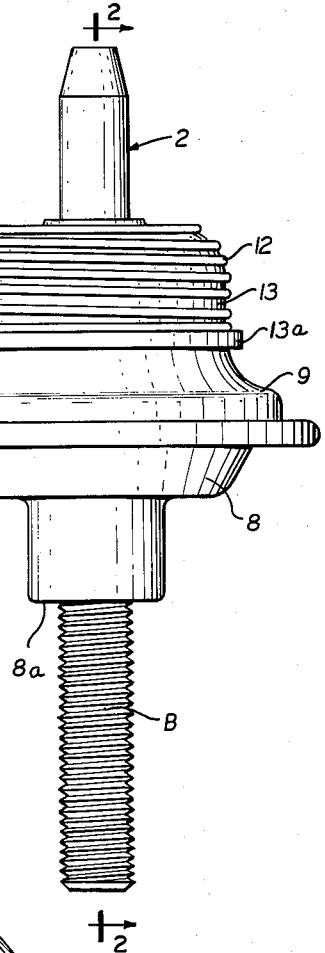
Fig. 1 is an elevation of the improved device.

The improved device comprises the usual flexible diaphragm 1 which has an annular shape with a circular inner edge and a circular outer edge. At its outer edge, the flexible diaphragm 1 is clamped between the casing member 8 and the casing member 9. For this purpose, each of said casing members 8 and 9 has a flat peripheral flange which is transverse to the longitudinal axis of the casing 8—9.

The casing members 8 and 9 are made of any suitable metal. The flexible diaphragm 1 can be made of rubber or any flexible and resilient rubber-like material. The casing member 9 is bent at its periphery to provide a clamping lip 9a which serves to clamp the planar peripheral faces of the casing members 8 and 9 towards each other, thus firmly holding the outer edge portion of the diaphragm 1 in position, and sealing the joint between the casing members 8 and 9 in an air-tight manner.

The device comprises a longitudinal spindle 2 which can be reciprocated in the direction of its longitudinal axis. This spindle 2 can be made of any suitable metal. It is designated in the trade as a "bumper stud." This spindle 2 has an integral reduced end-portion 2a which is of cylindrical shape. A fitting 10 has a hollow longitudinal shank 10b. This shank 10b fits upon the reduced end 2a of the spindle 2.

This shank 10b is rigidly fixed to the reduced end 2a, either by a drive fit or by any other mechanical means, so that the fitting 10 and the spindle 2 are longitudinally reciprocated in unison. This fitting 10 is made of any non-magnetic material which may be brass or a suitable plastic. In this example, the fitting 10 and its integral shank 10b are rigid and are made of nylon.

The fitting 10 has an inner planar face 10a which is transverse to the longitudinal axis of the device. The inner edge portion of the flexible diaphragm 1 is rigidly fixed to said planar face 10a by means of a rigid clamping washer 5 which can be made of nylon and which is suitably fixed to the fitting 10. The combination of a flexible diaphragm 1 and the fitting 10 thus separates the internal space of the casing 8—9 into respective chambers C and Ca.

A channel 11 is provided at the junction between the body of the fitting 10 and its integral shank 10b. This channel 11 may consist of one or more holes which are designed or set to permit a limited passage of air from the chamber C to the chamber Ca, when the air pressure within the chamber C exceeds the air pressure within the chamber Ca. The casing member 9 is provided with an internal cylindrical flange 9b, in which the cylindrical shank 10b of the fitting 10 has a sliding fit. However, this fit is not an air-tight fit, so that if the air within the chamber Ca is under greater pressure than the external atmosphere, the compressed air within the chamber Ca can pass freely between the internal cylindrical wall of the flange 9b and the outer cylindrical wall of the sleeve or extension 10b, into the outer atmosphere.

A permanent bar magnet 14, which has longitudinally opposed north and south magnetic poles, is located within the sleeve extension 10b. This permanent magnet 14 may have a cylindrical shape or it may have a square or other rectangular cross-section. This permanent magnet 14 may have a drive fit within the sleeve extension 10b of the fitting 10, or the permanent magnet 14 may be held in position by any suitable means. The inner end of the permanent magnet 14 does not obstruct the channel or channels 11. The fitting 10 includes an integral inwardly-directed cylindrical flange 10c.

A valve washer 7, which can be made of rigid nylon, is firmly secured within said flange 10c. This valve washer 7 has a longitudinal bore 7a which registers or communicates with the set channel or channels 11.

The wall of the bore 7a is shaped to provide a valve seat which cooperates with the ball valve 3 which is made of steel or other ferromagnetic material.

Figure 2:
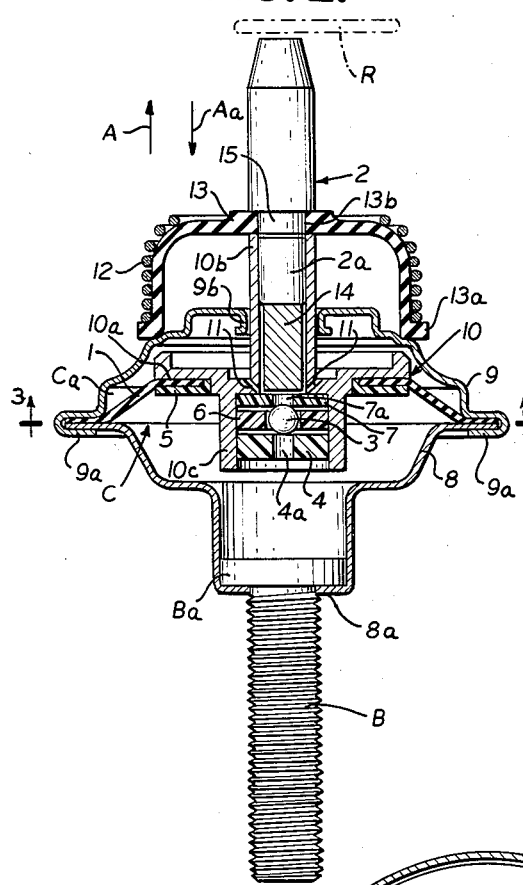
Fig. 2 is a section on the line 2—2 of Fig. 1.
Figure 3:
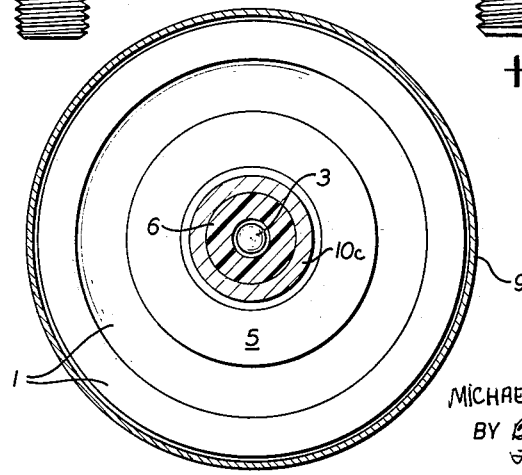
Fig. 3 is a section on the line 3—3 of Fig. 2.

The permanent magnet 14 attracts the ball valve 3, in order to yieldingly hold the ball valve 3 in the normal closure position illustrated in Fig. 2. In this normal closure position, the valve seat which is provided in the bore 7a of the valve washer 7, is set or designed so as to permit a limited passage of air through said valve seat and around the inner end of magnet 14 and through the inner channel or channels 11, when the air pressure within the chamber C exceeds the air pressure within the outer chamber Ca.

When the valve 3 is in its normal closure position illustrated in Fig. 2, the chambers C and Ca are sealed air-tight from each other, save for the limited flow of air from the chamber C to the chamber Ca through the valve seat of the ball valve 3, around the inner end of magnet 14 and through the outlet channel or channels 11.

The casing section 8 is provided with an integral and annular and transverse flange 8a. This flange 8a is bent around the head Ba of a longitudinal bolt B. This head Ba is held tightly within the respective cylindrical portion of the casing 8. The bolt B serves to rigidly fix the assembled casing 8—9 to a suitable support.

The ball valve 3 has a limited longitudinal movement within the bore of a washer 6 which is made of rigid nylon or other suitable non-magnetic material. This washer 6, like the valve washer 7, has a drive fit within the cylindrical longitudinal flange 10c, or said washers 6 and 7 can be fixed in position within said flange 10c in any suitable manner.

A stop washer 4, which has an axial bore 4a, has a tight drive fit within the cylindrical flange 10c, or said washer 4 is fixed within said flange 10c in any suitable manner. This washer 4 can also be made of rigid nylon or other suitable non-magnetic material. The cylindrical bore 4a is of smaller diameter than the ball valve 3, in a longitudinal inward direction which is away from the magnet 14.

An outer resilient and flexible cup 13 has an end flange 13a which abuts the casing member 9. Said cup 13 also has an end 13b which fits within and engages the circumferential wall of a transverse circumferential recess 15 of the longitudinal spindle 2. A helical coil spring 12, which has the shape illustrated in Fig. 2, is mounted upon the outer face of this resilient and flexible cup 13. This helical spring 12 has circumferentially-disposed coils which exert inner circumferential pressure upon the flexible cup 13. The cup 13, in combination with spring 12, thus acts as a spring to maintain the spindle 2 and the fitting 10 normally in the position illustrated in Fig. 2.

When spindle 2 is pushed longitudinally inwardly in a retarded dash-pot action, in a direction towards the bolt B, the combination of the rigid fitting 10 and the flexible diaphragm 1 compresses the air within the chamber C, to a pressure which exceeds the outer atmospheric pressure. During this inward dash-pot action of the spindle 2, the ball valve 3 is maintained in normal position upon its set valve seat, by means of the permanent magnet 14.

During the inward dash-pot movement of the spindle 2, the air pressure within the chamber C is raised above outer atmospheric pressure, and such excess air pressure tends to maintain the ball valve 3 upon its set valve seat. The slow and regulated flow of air from the chamber C to the chamber Ca, through the set valve seat and around the inner planar end of magnet 14, through the outlet channel or channels 11, which results during this inward dash-pot movement of the spindle 2, thus retards the inward movement of the spindle 2, in the usual dash-pot action. The spindle 2 is thus moved inwardly in its dash-pot action by the actuation of the rod R which is suitably connected to and moved by the mechanism or part which is to be controlled.

During the inward dash-pot action of the spindle 2, the air pressure within the outer chamber Ca is maintained at outer atmospheric pressure of substantially equal thereto, because the limited flow of air through the channel or channels 11 can easily escape through the non-sealing joint between the flange 9b and the sleeve 10b, and also through the joint between the edge 13a of the cup 13 and the casing member 9.

During the quick outward reverse movement of the spindle 2 under the force of the resilient cup 13 and the spring 12, the air pressure within the chamber Ca temporarily exceeds the air pressure within the chamber C. This temporary excess air pressure moves the ball valve 3 inwardly out of its normal closure position and away from its valve seat, thus permitting a relatively free flow of air through the channel or channels 11 and through the valve seat of valve 3, so that the outward return movement of spindle 2 is much quicker than its inward dash-pot movement.

While a specific embodiment of the invention has been shown and described in detail to illustrate the application of the invention principles, it will be understood that the invention may be embodied otherwise without departing from such principles.

What is claimed is:

1. A dash-pot device comprising, in combination, means forming a casing; a flexible diaphragm dividing said casing into a pair of chambers; an operating member extending slidably through a wall of said casing and perpendicular and attached to said diaphragm, said operator extending through one of said chambers; means biasing said operator outwardly of said casing; diamagnetic material means, including a valve seat, establishing communication between said chambers; a paramagnetic material ball check valve cooperable with said valve seat to restrict communication between said chambers; and a magnet carried by said operator and effective to attract said valve to seat against said valve seat; said valve, upon inward movement of said operator, being retained seated against said valve seat by the action of said magnet augmented by the resultant relative increase in pressure in one of said chambers, to retard such movement of said operator; said valve, upon outward movement of said operator, disengaging said seat by virtue of the resultant relative increase in pressure in the other chamber opposing the action of said magnet, to facilitate outward movement of said operator; said communication establishing means comprising a fitting secured to said operator and having an annular flat surface portion overlying the outer surface of said diaphragm, a circular flat surface portion off-set axially inwardly from said annular surface portion, and a tubular portion projecting inwardly from the inner surface of said diaphragm; said circular flat surface portion having apertures communicating with said tubular portion; said valve seat comprising a diamagnetic material washer at the base of said tubular portion, said valve seating against said washer; and said magnet being aligned with the axis of said washer.

2. A dash-pot device as claimed in claim 1 including a second diamagnetic material washer in said tubular portion and laterally surrounding said valve.

3. A dash-pot device as claimed in claim 2 including a third diamagnetic material washer in said tubular portion and limiting movement of said valve away from said valve seat.

References Cited in the file of this patent

UNITED STATES PATENTS

| | | |
|---|---|---|
| 2,597,952 | Rosenlund | May 27, 1952 |
| 2,657,038 | Emerson | Oct. 27, 1953 |
| 2,862,702 | Emerson | Dec. 2, 1958 |
| 2,894,740 | Emerson et al. | July 14, 1959 |

FOREIGN PATENTS

| | | |
|---|---|---|
| 744,858 | Great Britain | Feb. 15, 1956 |